Sept. 6, 1938.　　F. STEBLER ET AL　　2,128,972
BOX FEEDING MECHANISM
Filed May 25, 1936　　　4 Sheets-Sheet 1

INVENTORS
Fred Stebler
George P. Marsden
BY
Lyon & Lyon ATTORNEYS

Sept. 6, 1938.   F. STEBLER ET AL   2,128,972
BOX FEEDING MECHANISM
Filed May 25, 1936   4 Sheets-Sheet 2
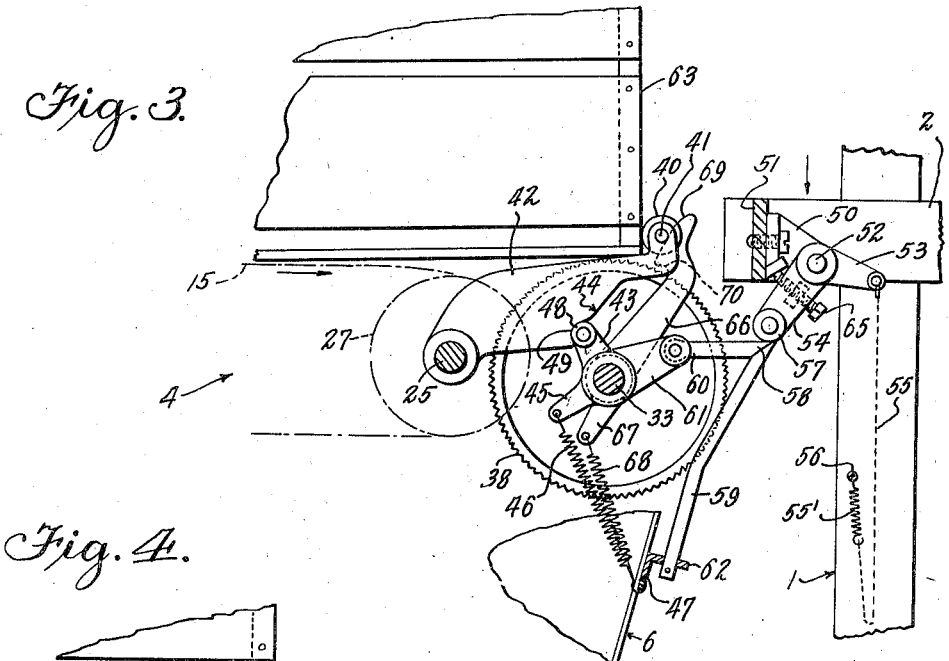
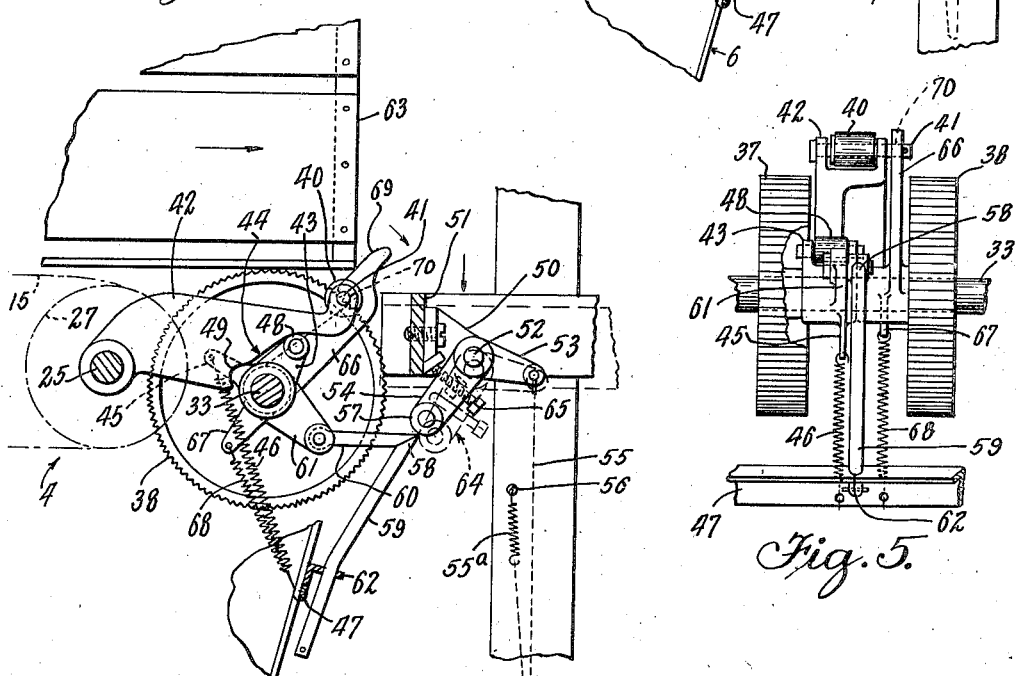
INVENTORS
Fred Stebler
George P. Marsden
BY Lyon & Lyon
ATTORNEYS Sept. 6, 1938.  F. STEBLER ET AL  2,128,972
BOX FEEDING MECHANISM
Filed May 25, 1936  4 Sheets-Sheet 3

INVENTORS
Fred Stebler
George P. Marsden
BY Lyon & Lyon
ATTORNEYS

Sept. 6, 1938.  F. STEBLER ET AL  2,128,972
BOX FEEDING MECHANISM
Filed May 25, 1936  4 Sheets-Sheet 4

Inventors
Fred Stebler
George P. Marsden
By Lyon & Lyon
Attorneys

Patented Sept. 6, 1938

2,128,972

UNITED STATES PATENT OFFICE 2,128,972

BOX FEEDING MECHANISM

Fred Stebler and George P. Marsden, Riverside, Calif., assignors to Food Machinery Corporation, San Jose, Calif., a corporation of Delaware Application May 25, 1936, Serial No. 81,650

6 Claims. (Cl. 1—10)

Our invention relates to box feeding mechanism, and has particular reference to feeding accumulating conveyers employed in connection with the conveying of filled boxes to machines where covers, or other appurtenances to the boxes, may be placed thereon.

In the fruit and vegetable packing industry it is the common practice to employ a continuously operating conveyer either of the roller or belt conveyer type passing a number of packing tables where boxes are packed with vegetables or fruits and when so packed are placed upon the conveyer for delivery to machines for performing further operations upon the box.

For example, in the citrus packing industry, the oranges or grapefruit are packed in boxes at the packing tables and are then placed upon the conveyer to be carried to a lidding and strapping machine, at which lids are placed upon the boxes, and are nailed and strapped thereto. Since the conveyer passes a number of packing tables, the boxes from the different tables will all be carried toward the lidding machine, which machine, however, can operate only upon one box at a time and hence, when a number of boxes approach the lidding machine in close succession, some means must be provided for "accumulating" or permitting such accumulation of boxes to be stopped adjacent the lidding machine to wait their turn for entry into the lidding machine.

The conveyers which are commonly employed in this industry being power driven, the mere interpositioning of stops in the path of the boxes would hold these boxes stationary while the conveyer belts or rollers would continue to rotate under the boxes, thus rapidly wearing out the conveyer mechanism.

It is, therefore, an object of our invention to provide an accumulator or conveyer section interposed between the usual box conveyer and the lidding or strapping machine upon which accumulator a succession of boxes may come to rest to await their turn for entry into the lidding machine, such accumulator including one or more power driven rollers continuously rotating beneath the boxes, urging the boxes toward the lidding machine, but so designed as to resist wear due to the frictional contact thereof with the boxes.

Another object of our invention is to provide an accumulator of the character set forth in the preceding paragraph, wherein one or more rollers are employed upon the accumulating conveyer section continuously driven by power to continuously urge the boxes toward the lidding machine, and in which a stop mechanism is interposed between the end of the accumulating conveyer and the nailing table of the box lidding machine to engage the foremost box and hold the same against entry into the lidding machine until such stop is removed.

Another object of our invention is to provide an accumulating conveyer of the character set forth in the preceding paragraphs, in which the stop mechanism is automatically removed from the path of the foremost box by one complete operation of the lidding or strapping machine, it being essential that the lidding or strapping machine complete its operation prior to the release of the stop mechanism.

Another object of the invention is to provide an accumulating conveyer of the character set forth wherein the box stop mechanism is provided for engaging the forward end of the foremost box to hold the same against entry into the lidding machine and to provide means actuated by a completed lidding or strapping operation by the lidding or strapping machine for releasing the stop mechanism and for holding the same out of the path of other boxes until the next box has entered the lidding machine.

Another object of the invention is to provide an accumulator as set forth in the preceding paragraphs, in which the box stop mechanism is moved out of the path of the foremost box by the completion of the operation of the lidding or strapping machine, and is restored to box-engaging position only when a subsequent box has entered the lidding machine and the lidding machine has not yet completed its lidding operation.

Other objects and advantages will be apparent from a study of the following specifications, read in connection with the accompanying drawings, wherein Figure 1 is a side elevational view of our accumulating conveyer illustrated in position between the end of a box conveyer and a lidding machine;

Fig. 3 is a detail view of the box stop mechanism and the releasing mechanism therefor which may be employed with the accumulating conveyer shown in Figs. 1 and 2;

Fig. 4 is a detail view, similar to Fig. 3, illustrating the manner in which the box stop mechanism is moved out of the path of the foremost box by the completion of the operation of the lidding machine;

Fig. 5 is an elevational view of the box stop mechanism shown in Fig. 3;

Figure 1:
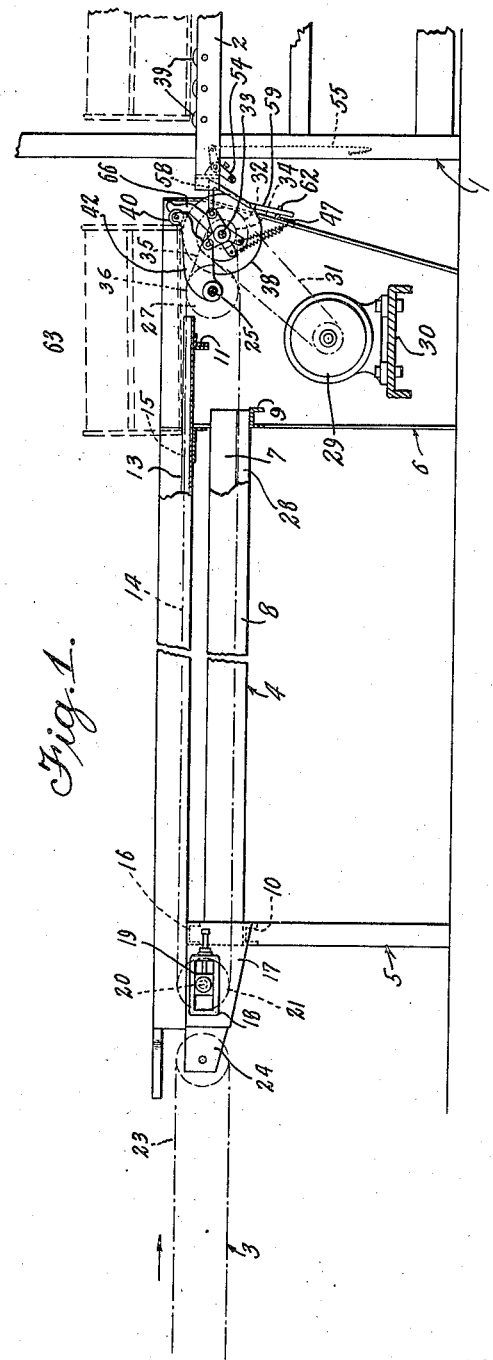
Figure 2:
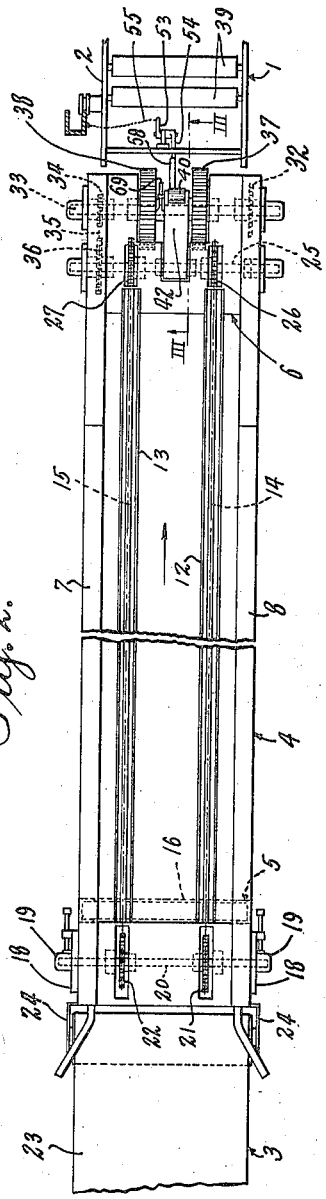
Fig. 2 is a plan view of our accumulating conveyer interposed between a box conveyer and a lidding machine similar to those shown in Fig. 1.

Referring to the drawings, we have illustrated a box lidding machine at 1, which machne may be of any of the well-known types generally employed for lidding boxes of vegetables or fruit, the particular lidding machine referred to and illustrated herein being illustrated and described in detail in United States Letters Patent granted to Hale Paxton, No. 2,088,592.

Reference to this particular type of lidding machine is made only for illustrative purposes, and, as will be made more apparent hereinafter, any of the well-known types of lidding machines may be substituted therefor.

Interposed between the nailing table 2 of the lidding machine 1 and the end of a box conveyer 3 (which may be of any of the well-known types commonly employed in the vegetable and fruit packing industry) is an accumulating conveyer 4. The accumulating conveyer comprises an end frame 5 which may be of any suitable construction, as for example an inverted U-shaped form of angle iron or channel iron and a second end frame 6 which is preferably stamped from sheet metal and constitutes an inverted U-shaped frame member for supporting the opposite end of the conveyer. Interconnecting the two frames 5 and 6 are side rails 7 and 8 which are cross-connected laterally of the conveyer by means of a plurality of cross braces 9 and 10. Extending laterally across the end frame 6 is a cross brace or angle member 11 which constitutes one end support for a pair of channels 12 and 13 constituting tracks in which a pair of chains 14 and 15, respectively, may ride. The opposite ends of the channels 12 and 13 are supported upon the base 16 of the inverted U-shaped frame 5.

Fixed to the sides of the U-shaped frame 5 are a pair of rearwardly extending brackets 17 to which are secured bearing members 18 carrying trunnions 19 in which opposite ends of a sprocket shaft 20 may be journaled. The sprocket shaft 20 has a pair of sprockets 21, 22 thereon, over which the chains 14 and 15, respectively, ride, the sprockets 21, 22 extending upwardly to such position as to align the chains 14 and 15 with the upper surface of their channel tracks 12 and 13. As will be understood by those skilled in the art the level of the upper side of the chains 14 and 15 should be approximately at the same level as the upper side of the belt 23 of the usual conveyer 3. The brackets 17 may, if desired, have extensions 24 thereon, adapted to engage the end of the conveyer to accurately align the accumulating conveyer therewith.

Extending laterally across the framework 6 is a second sprocket shaft 25 which supports a pair of sprockets 26 and 27 so that the chains 14 and 15 may have an endless path over which they travel, the lower side of the chain being supported in suitable trackways 28 extending between the cross braces 9 and 10.

The chains 14 and 15 constitute the box-supporting and conveying mechanism which will carry the boxes through our accumulating conveyer and these chains are preferably continuously driven by power from a motor 29 supported upon a suitable shelf 30 extending laterally of the framework 6. The motor may be connected by any suitable drive mechanism, such as a chain 31, passing over a sprocket 32 on a shaft 33 which in turn carries a sprocket 34 connected by a chain 35 to a sprocket 36 on the shaft 25.

Supported upon the sprocket shaft 33 is a pair of rollers 37, 38 which are preferably of such diameter that they project slightly above the level of the chains 14 and 15 and are preferably operated at a greater peripheral speed than the lighter speed of movement of the chains 14 and 15.

With the apparatus thus far described, a succession of boxes passing along the conveyer 3 will enter upon our accumulating conveyer and be picked up by the chains 14 and 15 and carried therethrough until the forward end of the first box engages and rides up onto the surface of the rollers 37 and 38. Due to the excess peripheral speed of these rollers, the foremost box will move over the rollers 37 and 38 at a greater speed than the remainder of the boxes are moving with the chains 14 and 15 themselves providing a space between the rear end of this foremost box and the forward end of the succeeding box. The foremost box, which has been passed upon the rollers 37, 38 will therefore be moved onto the nailing table 2 of the lidding machine 1 where it will engage and ride upon the conveyer rollers 39 of this nailing table and thus be permitted to pass directly into the nailing position on the lidding machine.

The fact that the foremost box moves more rapidly than the remainder of the boxes on our accumulating conveyer, provides a space between succeeding boxes in which a stop mechanism may move to engage the second box and hold the same against entry into the lidding machine until such stop is subsequently removed. This stop mechanism (see Figs. 3, 4 and 5), comprises a roller 40 rigidly mounted upon a stub shaft 41 journaled in the bifurcated upper end of a bracket 42. The bracket 42 is preferably pivoted upon the sprocket shaft 25 so that the roller may be moved upwardly upon a partial rotation of the bracket 42 in a counterclockwise direction, and may move downwardly out of the path of the boxes by a partial rotation of the bracket 42 in a clockwise direction. The bracket 42 is normally in the position shown in Fig. 3, namely with the roller 40 projecting upwardly above the level of the high speed rollers 37 and 38 by means of a holding lever arm 43. The holding lever arm 43 is journaled upon the sprocket shaft 33 and has rigidly secured thereto a tailpiece 45 connected by means of a spring 46 to some stationary part 47 of the end frame 6, so that the crankarm 43 is normally urged in a counterclockwise direction to normally position its roller 48 in its enlarged portion 49 of the cam surface 44 at such level as to hold the stop roller 40 in its uppermost position.

As is usual in the construction of the lidding machines, the lidding operation is performed first by the pressing of a cover down upon the box until the cover ends are brought into contact with the box ends, whereupon the nailing mechanism of the lidding machine operates to nail the cover ends to the box ends and the various pieces of apparatus of the nailing machine are then restored to their normal positions to release the lidded box, permitting the same to pass out of the machine. These machines are usually of one or the other of two types, one in which the nailing table or box-supporting table remains stationary, and the lid pressing and nailing mechanisms are drawn downwardly thereto, or the nailing mechanisms are relatively stationary and the box-supporting table is elevated during the lidding operations to perform the functions of pressing the cover into place and nailing the same thereon. The particular lidding machines diagrammatically illustrated herein is one of the type in which the box-supporting or nailing table 2 is elevated from a lowermost position to an uppermost position to perform the pressing and nailing operations, and we employ this movement of the nailing table for the purpose of automatically releasing the box stop roller 40 whenever the lidding machine has completed one of its lidding and nailing operations.

We utilize the completion of one lidding operation of the lidding machine to cause the release or removal of the box stop roller 40 from its projection into the path of the next succeeding box by connecting the crankarm 43 to be actuated out of its notch 49 by some moving part of the lidding machine which operates only when the lidding machine has gone through a whole cycle of operations. For example, in the form of the lidding machine illustrated herein, we employ a full complete reciprocation of the nailing table as the means for releasing the box stop 40 mounting a bracket 50 upon one of the cross bars 51 of the nailing table 2, and pivoting upon a shaft 52 attached to said bracket a bellcrank having two arms 53 and 54. One of the arms 53 is connected by means of a slack chain 55 to some stationary part 56 of the lidding machine, and the length of the chain 55 is selected such that when the nailing table 2 has been lifted to its extreme upper position the chain 55 will be tightened, thus drawing the bellcrank 53 downwardly, to swing the bellcrank in a clockwise direction. If desired, a spring 55' may be interposed in the chain 55 so as to make this chain slightly shorter than is necessary for one full stroke of the nailing table 2, any over-run of the nailing table 2 being fixed by the stretch of the spring 55'. The opposite arm 54 of the bellcrank carries a roller 57 which, when the bellcrank arm 53 is drawn downwardly, is projected to such position that when the nailing table 2 again descends (after the lidding operation has been completed) the roller 57 will traverse a path which is intersected by the outwardly extending elbow 58 of a rod 59. One end 60 of the rod 59 is pivotally secured to a crankarm 61 which is integrally formed with the crankarm 43 and the tailpiece 45, while the opposite end of the rod 59 is slidably mounted in a bearing member 62 mounted upon some stationary part of the end frame 6. Thus as the nailing table 2 descends, bringing with it the bellcrank 53, 54, the roller 57 will engage the elbow 58 of the rod 59 when the nailing table is still several inches above its lowermost position (as shown in Fig. 3). Then the further downward movement of the nailing table 2 toward its final lowermost rest position will cause the bellcrank arm 54 to carry the rod 59 downwardly and thus swing the crankarms 61 and 43 in a clockwise direction to the position shown in Fig. 4. This movement of the crankarms 61 and 43 will remove the roller 48 from the notch 49, and will allow the bracket 42 to descend, removing the stop roller 40 from its position in front of the next succeeding box 63.

It will be noted from an inspection of Fig. 4 that the rod 59 being engaged at the outer end of the crankarm 61 will move not only downwardly but slightly to the left as viewed in Figs. 3 and 4, until the extreme outer portion of the elbow 58 has moved out of the path of movement of the descending bellcrank arm 54 so that when the nailing table 2 arrives at its lowermost position the roller 57 of the bellcrank 54 will clear the elbow 58 of the rod 59, thus releasing the rod 59 and the crankarms 61, 43, allowing these crankarms to be restored to their normal position as shown in Fig. 3 under the influence of spring 46. The foremost box, released by movement of the box stop roller 40, is now free to move onto the nailing table 2 of the lidding machine, and since this box has been resting upon the drive or friction rollers 37, 38, these rollers (continuously rotating) will positively move this box forwardly onto the nailing table where it will be positioned ready for the next lidding operation of the lidding machine 1. However, since the crankarms 61 and 43 are permitted to move back to their original positions under the influence of the spring 46, it will be apparent that the roller 48 on the crankarm 43 will tend to ride upon the cam surface 44 and tend to swing the bracket 42 and the stop roller 40 back to their box stopping position. However the roller 40 will engage the bottom of the foremost box 63 until the rear end of this box has cleared the stop roller 40 and then the stop roller 40 will be snapped up into the space between this foremost box and the next succeeding box, thus constituting an abutment against which the next succeeding box will come to rest.

The bellcrank 53, 54 on the nailing table 2 will again be drawn upwardly when the nailing table 2 of the lidding machine is again elevated to lid the box which has just been delivered thereto and as this nailing table starts upon its upward travel the roller 57 on the crankarm 54 will ride upon the angular surface of the rod 59, thus rotating the bellcrank 53, 54 back to its initial position, as shown in dotted lines at 64 in Fig. 4. The engagement between the bellcrank 53 and 54 and its pivot shaft 52 is preferably sufficiently tight, or has sufficient friction, to hold the bellcrank 53, 54 in either of its positions, as shown in full lines and dotted lines, respectively, in Fig. 4, when the bellcrank has been moved to either one of these positions, and requiring the positive exertion of some force on the bellcrank 53, 54 to move the same to its opposite position. The upward movement of the nailing table 2, therefore, restores the bellcrank 53, 54 to its normal position in which, as will be noted from an inspection of Fig. 4, the path of movement of the roller 57 of the bellcrank 54 will be such as to clear the outer end of the elbow 58. Thus should the operator elevate the table only partially, and then allow it to descend, while he rearranges the fruit in the box or inserts a new cover to replace one which is damaged, as is frequently necessary during the lidding operation of the lidding machine, the partial operation of the nailing table will not swing the bellcrank 53, 54 back into a position of possible engagement with the elbow 58 and hence the stop roller 40 will not be removed from the next succeeding box unless and until the nailing table 2 has made a complete ascension necessary for the completion of the lidding operation. An adjusting screw 65 may be employed on the bellcrank arm 54 to adjust the extent of movement of the bellcrank 53, 54 to insure that when the nailing table 2 has been moved to its lowermost position it will ride off of the elbow 58. As was hereinbefore described, the lowering of the box stop roller 40 permits the first or foremost box to move into the lidding machine and the stop roller 40 again ascends to catch the next succeeding box. However, it may take some appreciable time for the foremost box 63 to get under way after the descent of the stop roller 40 and to prevent too rapid return of the stop roller 40, which might place this roller again in front of the foremost box 63, we prefer to provide latching mechanism which will positively hold the stop roller 40 in its lowermost position until the foremost box has cleared the stop roller. This latching device may comprise a hook member 66 pivoted upon the shaft 33 and having a tailpiece 67 thereon connected by means of a spring 68 to some stationary part of the machine, as at 47, so that the hook 66 is normally urged in a counterclockwise direction.

As will be more readily observed in Fig. 5, the shaft 41 which journals the stop roller 40 on its bracket 42, may extend beyond the bracket 42 into the path of movement of the hook member 66. The hook member 66 has an upwardly projecting face 69 thereon which will bear against the projecting shaft 41 in such relation that when the bracket 42 is moved to draw the stop roller 40 downwardly, the shaft 41 will push the hook member 66 against the influence of its spring 68 to the position shown in Fig. 4. At this point a notch 70, formed in the hook member 66, will be aligned with the descending shaft 41 and will engage over this shaft 41, preventing the immediate return upward movement of the bracket 42. The upper surface 69 of the hook member 66, however, will at this time be interposed in the path of movement of the box 63 so that as this box moves toward the nailing table of the lidding machine the end of the box 63 will engage the hook member 66 and move the same still further in a clockwise direction until (due to the fact that the hook member 66 operates about a different center from that of the bracket 42) the hook member 69 will release the shaft 41, allowing the bracket 42 to reascend as was hereinbefore described. As soon as the rear end of the box 63 has cleared the hook member 66 this hook member will be restored to its original or normal position, as shown in Fig. 3.

From the foregoing description it will be observed that we have provided an accumulator conveyer wherein the boxes are drawn onto the accumulator conveyer by means of their chains 24 and 15, these chains presenting relatively non-wearing surfaces to the bottom of the box so that these chains may continue to move even though the boxes are held stationary without rapidly wearing out or destroying the chain conveyer. Further, the accumulator conveyer is provided with a pair of high speed rollers which engage the bottom of the foremost box and as soon as the same is released by the box stop, starts the foremost box forwardly at such rate that it will provide a space between this foremost box and the next succeeding box.

It will also be observed that as long as there is a box in the lidding machine and the lidding machine has not completed one of its cycles of lidding operations, the box stop will remain in stopping relation with the foremost box, but as soon as the lidding operation has been completed the stop is removed and the foremost box is then permitted to be passed to the lidding machine.

By reason of the fact that the completion of a lidding operation on one box permits the roller 40 to be moved downwardly out of the path of oncoming boxes, and the latching mechanism 66 holds the roller in this position until another box enters the lidding machine, it will be apparent that whenever the lidding machine is emptied or has completed a lidding operation, the path of the oncoming boxes is unobstructed so that the next box to be delivered to the accumulator conveyer will be free to pass directly into the lidding machine while whenever a box is in the lidding machine and the lidding operation thereon is uncompleted, the stop roller 40 is in the path of the next succeeding box and will hold all the boxes from entry into the machine until that box which is in the machine has been lidded.

Figure 6:
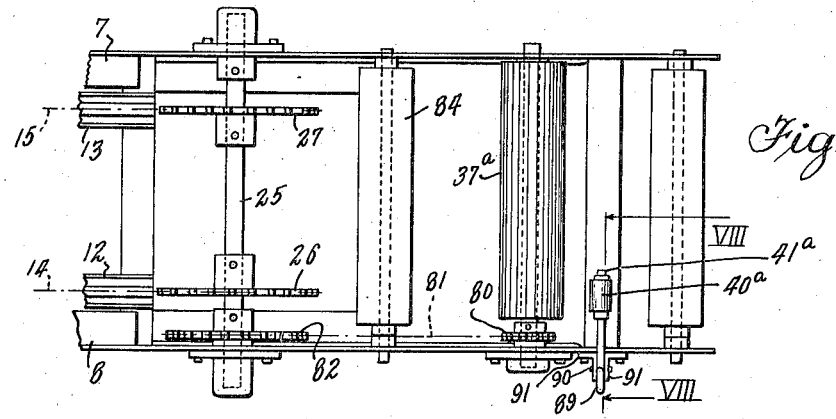
Fig. 6 is a detail view of a modified form of accumulating conveyer and box stop mechanisms which may be employed in carrying out our invention.
Figure 7:
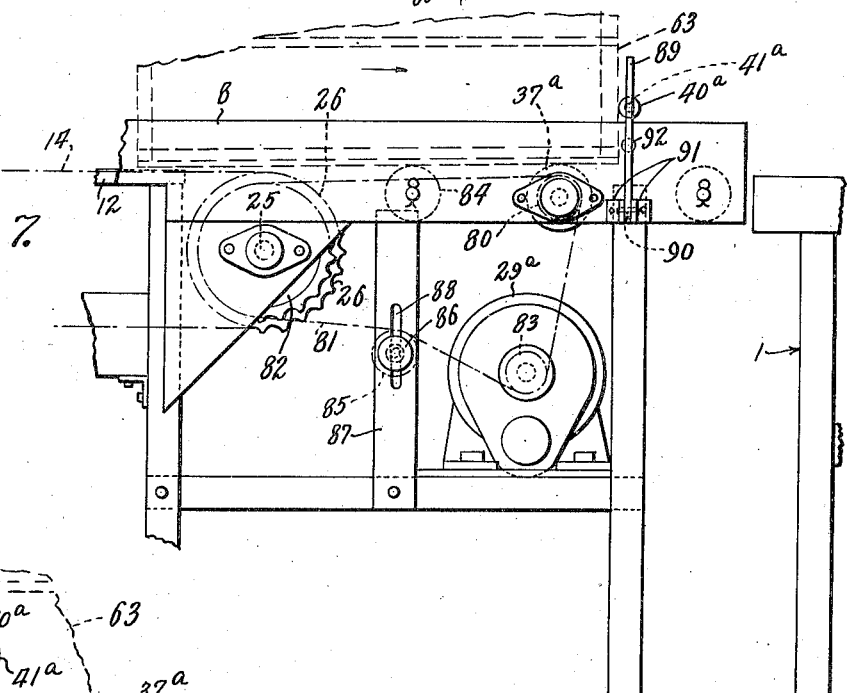
Fig. 7 is a side elevational view of the modified form of accumulator conveyer and stop mechanism illustrated in Fig. 6.
Figure 8:
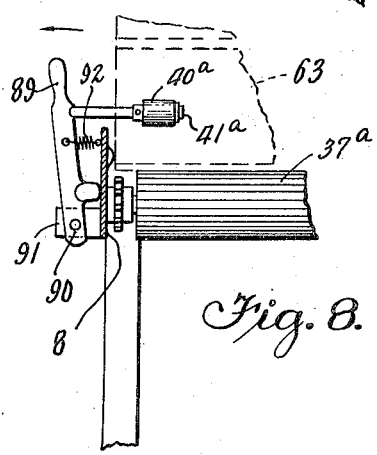
Fig. 8 is a detail sectional view, taken along line VIII—VIII of Fig. 6.
Figure 9:
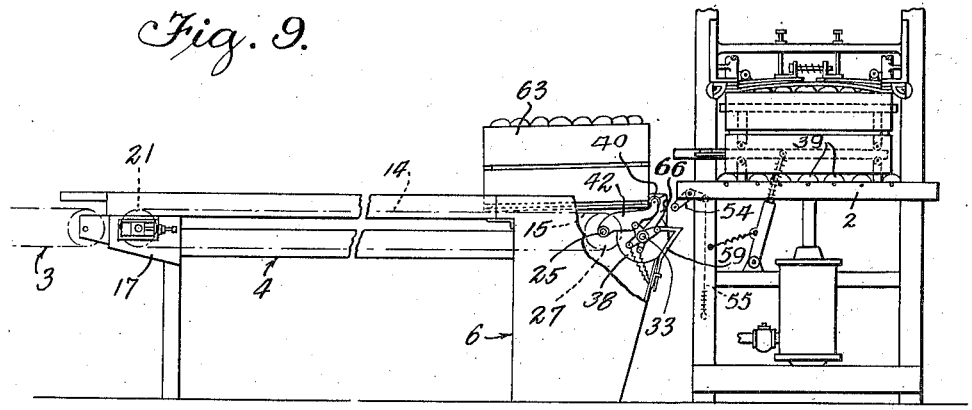
Fig. 9 is a side elevation illustrating the connection between the box feeding mechanism and a lidding machine.
Figure 10:
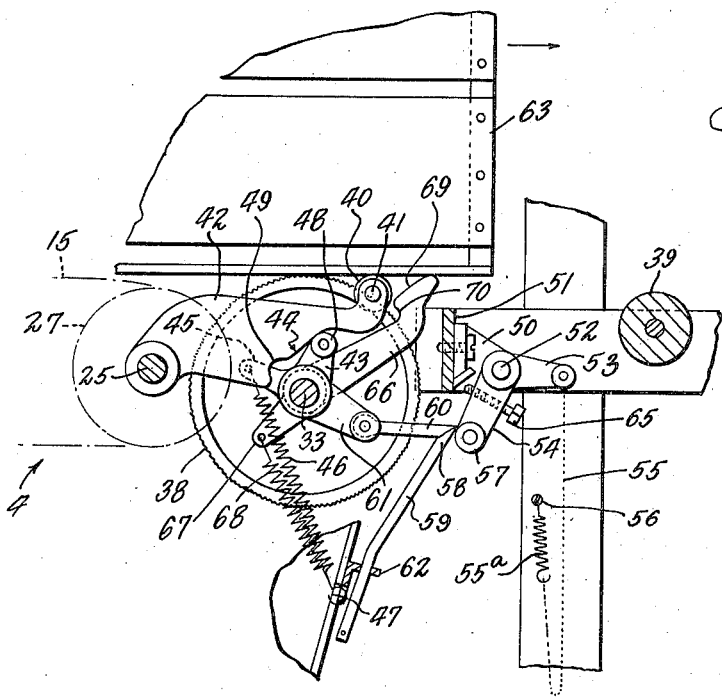
Fig. 10 is a detailed view of the box stop mechanism and the releasing mechanism therefor, showing the bottom of the box advanced sufficiently to bring member 69 below the bottom of the box.

In Figs. 6, 7 and 8 we have illustrated a modified form of our accumulator conveyer, wherein the accumulating conveyer, including the stand 5, the side rails 7 and 8 and tracks 12 and 13 and chains 14 and 15, may be identical with those described with reference to Figs. 1 to 5. Also the sprocket shaft 25, carrying the sprockets 26 and 27 for the chains 15 and 14 may be identical with those described with reference to Figs. 1 to 5. However, instead of employing the relatively large rollers 27, 28 as the high speed rollers, we may provide a small roller 37a having a sprocket 80 thereon connected by means of a chain 81 to a secondary sprocket 82 on the sprocket shaft 25. The chain 81 may pass directly over a pulley or sprocket 83 on the motor 29a so that the motor drives both the rollers 37a and the sprocket shaft 25. By suitably selecting the diameter of the sprocket 80 relative to the sprocket 82, it will be apparent that the roller 37a may be driven at a higher speed than the speed of movement of the chains 14 and 15. An idler roller 84 may be interposed between the high speed roller 37a and the sprockets 26, 27 to provide additional support for a box 63, if desired. Also the chain 81 may pass over an idler 85 journaled in bearings 86 slidably attached to an upright 87 on the end frame supporting the side rails 7 and 8.

The bearings 86 are preferably secured to the upright 87 by means of an elongated slot 88 permitting the idler 85 to be raised or lowered to tighten or slacken the chain 81.

A box stop roller 40a may be mounted upon a shaft 41a rigidly secured to a handle 89 pivoted at 90 upon a pair of brackets 91 secured to the side rail 8 so that this box stop roller 40a may be interposed in the path of movement of the foremost box 63 and hold this box from movement toward the lidding machine until the operator of the lidding machine manually moves the handle 89 in a counterclockwise direction as viewed in Fig. 8. A spring 92 normally urges the handle 89 in a clockwise direction to normally hold the roller 40a in the path of movement of the foremost box 63.

In this foremost position it will be apparent that the accumulating conveyer includes a pair of conveyer chains which will pass the box from the conveyer 3 onto the accumulating conveyer and will move the foremost box to a position where it is stopped by the stop roller 40a with its front end resting upon the continuously rotating high speed roller 37a. Then when the lidding machine has completed one of its lidding operations, the operator may manually move the stop roller 40a out of the path of the foremost box, allowing this box to pass into the lidding machine.

By merely releasing the handle 89 after the foremost box has started its forward movement, the roller 40a will be snapped by its spring 92 into the space provided between the foremost box and the next succeeding box.

While we have shown and described the preferred embodiment of our invention, we do not wish to be limited to any of the details of construction shown herein, except as defined in the appended claims.

We claim:

1. In an accumulator conveyer for interpositioning between a feeder conveyer and a box lidding machine, means for moving boxes from said feeder conveyer toward said machine, box stop means interposed in the path of movement of boxes through said accumulator conveyer, means for urging said box stop means into the path of movement of the foremost box on said accumulator conveyer, means on said lidding machine and operated at the completion of a lidding operation for moving said box stop means out of the path of said foremost box, means for holding said box stop means out of the path of said foremost box when so moved, and means actuated by the passage of said foremost box past said box stop means for releasing said holding means to allow said box stop means to be urged into the path of the next succeeding box.

2. In an accumulator conveyer for interpositioning between a feeder conveyer and a box lidding machine, means for moving boxes from said feeder conveyer toward said machine, box stop means interposed in the path of movement of boxes through said accumulator conveyer, means for urging said box stop means into the path of movement of the foremost box on said accumulator conveyer, means on said lidding machine and operated at the completion of a lidding operation for moving said box stop means out of the path of said foremost box, means for holding said box stop means out of the path of said foremost box when so moved, means actuated by the passage of said foremost box past said box stop means for releasing said holding means, and means for normally urging said box stop means into box-engaging position.

3. In combination with an accumulator conveyer having means for moving boxes therethrough, means for holding boxes on said accumulator conveyer including a box stop, means mounting said box stop for movement between two positions, in one of which said box stop is interposed in the path of movement of the end of a box on said accumulator conveyer and in the other of which said box stop is removed from possible engagement with the end of said box, actuating means for said box stop normally urging said box stop into box engaging position, a lidding machine disposed at the end of said accumulator conveyer for receiving boxes therefrom, and means on said lidding machine, and actuated by operation of said lidding machine in lidding a box, for moving said stop actuating means out of said urging relation with said stop to allow said stop to move to the other of its positions to free the foremost box on said accumulator conveyer.

4. In combination with a lidding machine for applying lids to boxes, an accumulator conveyer disposed immediately adjacent said lidding machine for passing boxes to said lidding machine, power driven means on said accumulator conveyer for moving boxes therethrough toward said lidding machine, a box stop at the end of said accumulator conveyer for engaging the foremost box thereon to hold the same against passage into said lidding machine, including a roller, a bracket pivoted on said accumulator conveyer and carrying said roller and movable between two positions, one interposing said roller in the path of a box on said accumulator conveyer and the other removing said roller from said path, a nailing table on said lidding machine movable between a normal rest position and an elevated position during operation thereof to lid a box, means operably responsive to the consecutive movements of said nailing table to its elevated position and return to its rest position for moving said bracket to move said roller out of the path of the foremost box on said accumulator conveyer.

5. In combination with a lidding machine for applying lids to boxes, an accumulator conveyer disposed immediately adjacent said lidding machine for passing boxes to said lidding machine, power driven means on said accumulator conveyer for moving boxes therethrough toward said lidding machine, a box stop at the end of said accumulator conveyer for engaging the foremost box thereon to hold the same against passage into said lidding machine, including a roller, a bracket pivoted on said accumulator conveyer and carrying said roller and movable between two positions, one interposing said roller in the path of a box on said accumulator conveyer, and the other removing said roller from said path, a holding lever disposed below said bracket and engaging beneath the same for normally urging said stop roller into box-engaging position, a nailing table on said lidding machine movable between a normal rest position and an elevated position during the operation thereof to lid a box, a rod on said holding lever projecting below said nailing table, a bellcrank carried by said nailing table, means pivoting said bellcrank upon said nailing table for movement between two positions, one in which the bellcrank is disposed in alignment with said rod to engage said rod when said nailing table is moved and another in which said bellcrank is disposed out of alignment with said rod, and means connected to said bellcrank and operable by said nailing table to its uppermost position for swinging said bellcrank into said one position, whereby when said table subsequently descends said bellcrank will engage said rod and move said holding lever to release said box stop.

6. In combination with a conveyer section over which boxes may travel, a box stop means associated with said conveyer section for engaging the foremost box thereon to hold the same against passage over said conveyer section, said box stop means including a roller, a bracket pivoted on said conveyer section and carrying said roller and movable between two positions, one interposing said roller in the path of a box on said conveyer and the other removing said roller from said path, a latch for said bracket, means mounting said latch to engage said bracket when said roller has been moved out of the path of a box on said conveyer section, means on said latch and extending into the path of movement of a box on said conveyer section for engagement by a box passing through said conveyer section to move said latch out of latching relation with said bracket when one box has passed said roller and to thereby free said roller for movement into the path of the next succeeding box.

FRED STEBLER.
GEORGE P. MARSDEN.